US007094322B1

(12) United States Patent
Kovach et al.

(10) Patent No.: US 7,094,322 B1
(45) Date of Patent: Aug. 22, 2006

(54) USE OF SELF-SUSTAINED ATMOSPHERIC PRESSURE PLASMA FOR THE SCATTERING AND ABSORPTION OF ELECTROMAGNETIC RADIATION

(75) Inventors: Kurt M. Kovach, Highlands, NJ (US); Seth Tropper, Old Bridge, NJ (US); Richard Crowe, Hazlet, NJ (US); Edward J. Houston, Metuchen, NJ (US); George Korfiatis, Basking Ridge, NJ (US); Erich Kunhardt, Hoboken, NJ (US)

(73) Assignee: Plasmasol Corporation Wall Township, NJ (US)

( * ) Notice: Subject to any disclaimer, the term of this patent is extended or adjusted under 35 U.S.C. 154(b) by 875 days.

(21) Appl. No.: 10/233,176

(22) Filed: Aug. 29, 2002

Related U.S. Application Data

(63) Continuation-in-part of application No. 09/738,923, filed on Dec. 15, 2000, now Pat. No. 6,818,193.

(60) Provisional application No. 60/171,198, filed on Dec. 15, 1999, provisional application No. 60/171,324, filed on Dec. 21, 1999, provisional application No. 60/316,058, filed on Aug. 29, 2001.

(51) Int. Cl.
*B01D 53/00* (2006.01)

(52) U.S. Cl. .............. 204/298.2; 204/164; 315/111.21; 423/210

(58) Field of Classification Search ............ 422/22–24, 422/33; 315/111.01–111.81; 204/192.11, 204/192.2, 298.07, 298.18, 164; 313/582, 313/631, 632, 491; 423/210
See application file for complete search history.

(56) References Cited

U.S. PATENT DOCUMENTS 3,594,065 A 7/1971 Marks ........................ 359/296

(Continued)

FOREIGN PATENT DOCUMENTS

EP 1 084 713 A1 3/2001

(Continued)

OTHER PUBLICATIONS

Vidmar, R.J., "On the Use of Atmospheric Pressure Plasma as Electromagnetic Reflectors and Absorbers", *IEEE Transactions on Plasma Science*, vol. 18 No. 4, Aug. 1990.

(Continued)

*Primary Examiner*—Wilson Lee
(74) *Attorney, Agent, or Firm*—Darby & Darby

(57) ABSTRACT

A self-sustained atmospheric pressure system for absorbing or scattering electromagnetic waves using a capillary discharge electrode configuration plasma panel and a method for using the same. Of particular interest is the application of this system to vary the level of exposure or duration of an object to electromagnetic waves, or as a diffraction grating to separate multiple wavelength electromagnetic waves into its respective wavelength components. The generation of the non-thermal plasma is controlled by varying the supply of power to the plasma panel. When a substantially uniform plasma is generated the plasma panel absorbs substantially all of the incident electromagnetic waves thereby substantially prohibiting exposure of the object (disposed downstream of the plasma panel) to the electromagnetic waves. If the generated plasma is non-uniform the plasma panel reflects at least some of the electromagnetic waves incident on its surface. When a multiple wavelength electromagnetic source is employed, the plasma panel scatters the waves reflected from its surface in different directions according to their respective individual wavelengths. The degree of separation between the various wavelength components depends on arrangement of and spacing between the capillaries. Thus, the system may be used as a diffraction grating for separating multiple wavelength electromagnetic waves into its respective wavelength components.

27 Claims, 3 Drawing Sheets

U.S. PATENT DOCUMENTS 3,948,601 A 4/1976 Fraser et al. .................. 422/23
4,147,522 A 4/1979 Gonas et al. .................. 95/68
4,357,151 A 11/1982 Helfritch et al. ............... 95/68
4,643,876 A 2/1987 Jacobs et al. ................. 422/23
4,698,551 A 10/1987 Hoag ......................... 313/619
4,756,882 A 7/1988 Jacobs et al. ................. 422/23
4,818,488 A 4/1989 Jacob .......................... 422/23
4,885,074 A 12/1989 Susko et al. ................ 204/298
4,898,715 A 2/1990 Jacob .................... 422/186.29
4,931,261 A 6/1990 Jacob ......................... 422/292
5,033,355 A 7/1991 Goldstein et al. ................ 89/8
5,062,708 A 11/1991 Liang et al. ................ 356/316
5,084,239 A 1/1992 Moulton et al. .............. 422/22
5,115,166 A 5/1992 Campbell et al. ....... 315/111.21
5,178,829 A 1/1993 Moulton et al. .............. 422/22
5,184,046 A 2/1993 Campbell .............. 315/111.21
5,186,893 A 2/1993 Moulton et al. .............. 422/23
5,288,460 A 2/1994 Caputo et al. ................ 422/23
5,325,020 A 6/1994 Campbell et al. ....... 315/111.21
5,376,332 A 12/1994 Martens et al. ............... 422/23
5,387,842 A 2/1995 Roth et al. .............. 315/111.21
5,408,160 A 4/1995 Fox ........................... 313/494
5,413,758 A 5/1995 Caputo et al. ................ 422/22
5,413,759 A * 5/1995 Campbell et al. ............. 422/23
5,413,760 A 5/1995 Campbell et al. ............. 422/24
5,414,324 A 5/1995 Roth et al. .............. 315/111.21
5,451,368 A 9/1995 Jacob .......................... 422/23
5,472,664 A 12/1995 Campbell et al. ............. 422/23
5,476,501 A 12/1995 Stewart et al. .............. 607/127
5,482,684 A 1/1996 Martens et al. ............. 422/119
5,498,526 A 3/1996 Caputo et al. ................ 435/31
5,549,735 A 8/1996 Coppom ........................ 96/63
5,593,476 A 1/1997 Coppom ........................ 95/78
5,593,550 A 1/1997 Stewart et al. .............. 204/164
5,593,649 A 1/1997 Fisher et al. ................ 422/305
5,594,446 A 1/1997 Vidmar et al. ................. 342/1
5,603,895 A 2/1997 Martens et al. ............... 422/23
5,620,693 A 4/1997 Wensky et al. ............. 424/401
5,637,198 A 6/1997 Breault ....................... 204/165
5,645,796 A 7/1997 Caputo et al. ................ 422/22
5,650,693 A 7/1997 Campbell et al. ........ 315/111.21
5,667,753 A 9/1997 Jacobs et al. ................. 422/29
5,669,583 A 9/1997 Roth .......................... 244/130
5,686,789 A 11/1997 Schoenbach et al. ....... 313/491
5,695,619 A 12/1997 Williamson et al. ........ 204/165
5,733,360 A 3/1998 Feldman et al. ............... 95/78
5,753,196 A 5/1998 Martens et al. ............. 422/293
5,872,426 A 2/1999 Kunhardt et al. ........... 313/582
5,939,829 A 8/1999 Schoenbach et al. ....... 313/632
6,005,349 A 12/1999 Kunhardt et al. ....... 315/111.21
6,007,742 A 12/1999 Czernichowski et al. ... 252/372
6,016,027 A 1/2000 De Temple et al. ........ 313/356
6,027,616 A 2/2000 Babko-Malyi .............. 204/164
6,113,851 A 9/2000 Soloshenko et al. .......... 422/22
6,146,724 A 11/2000 Roth .......................... 428/342
6,147,452 A 11/2000 Kunhardt et al. ........... 313/582
6,153,062 A * 11/2000 Saito et al. .............. 204/192.2
6,170,668 B1 1/2001 Babko-Malyi ........... 209/127.1
6,228,330 B1 5/2001 Herrmann et al. ..... 422/186.05
6,232,723 B1 * 5/2001 Alexeff .................. 315/111.21
6,245,126 B1 6/2001 Feldman et al. ............... 95/59
6,245,132 B1 6/2001 Feldman et al. ............... 96/28
6,255,777 B1 7/2001 Kim et al. .................. 313/582
6,322,757 B1 11/2001 Cohn et al. ............ 422/186.04
6,325,972 B1 12/2001 Jacobs et al. ................. 422/33
6,333,002 B1 12/2001 Jacobs et al. .................. 422/3
6,365,102 B1 4/2002 Wu et al. ..................... 422/23
6,365,112 B1 4/2002 Baboko-Malyi et al. ..................... 422/186.04
6,372,192 B1 4/2002 Paulauskas et al. ...... 423/447.1
6,375,832 B1 4/2002 Eliasson et al. ............ 208/141
6,383,345 B1 5/2002 Kim et al. ............. 204/192.11
6,395,197 B1 5/2002 Detering et al. ............ 252/373
6,399,159 B1 6/2002 Grace et al. ................ 427/536
6,433,480 B1 8/2002 Stark et al. ................. 313/631
6,451,254 B1 9/2002 Wang et al. .................. 422/33
6,458,321 B1 * 10/2002 Platt et al. .................... 422/23
6,475,049 B1 11/2002 Kim et al. .................... 445/24
6,497,839 B1 12/2002 Kasegawa et al. ............ 422/22
6,509,689 B1 1/2003 Kim et al. .................. 313/586
6,545,411 B1 4/2003 Kim et al. .................. 313/582
6,548,957 B1 4/2003 Kim et al. .................. 313/585
6,570,172 B1 5/2003 Kim et al. ............... 250/493.1
6,580,217 B1 6/2003 Kim et al. .................. 313/582
6,598,481 B1 7/2003 Lin et al. ...................... 73/702
6,599,471 B1 7/2003 Jacobs et al. .................. 422/3
6,627,150 B1 9/2003 Wang et al. .................. 422/33
6,632,323 B1 10/2003 Kim et al. ............. 156/345.43
6,635,153 B1 10/2003 Whitehead .................. 204/176
6,673,522 B1 1/2004 Kim et al. .................. 430/321
6,685,523 B1 2/2004 Kim et al. .................... 445/24
6,818,193 B1 11/2004 Christodoulatos et al. .. 423/210
2002/0011203 A1 1/2002 Kim .......................... 118/305
2002/0011770 A1 1/2002 Kim et al. .................. 313/310
2002/0045396 A1 4/2002 Kim ............................ 445/24
2002/0092616 A1 7/2002 Kim ...................... 156/345.43
2002/0105259 A1 8/2002 Kim .......................... 313/491
2002/0105262 A1 8/2002 Kim .......................... 313/495
2002/0122896 A1 9/2002 Kim et al. .................. 427/569
2002/0124947 A1 9/2002 Kim .......................... 156/247
2002/0126068 A1 9/2002 Kim et al. .................... 345/60
2002/0127942 A1 9/2002 Kim et al. .................... 445/24
2002/0139659 A1 10/2002 Yu et al. ..................... 204/164
2002/0144903 A1 10/2002 Kim et al. ............. 204/298.18
2002/0148816 A1 10/2002 Jung et al. ............ 219/121.41
2002/0187066 A1 12/2002 Yu et al. ....................... 422/22
2003/0003767 A1 1/2003 Kim et al. .................. 438/763
2003/0015505 A1 1/2003 Yu et al. ................ 219/121.43
2003/0035754 A1 2/2003 Sias et al. ..................... 422/29
2003/0048240 A1 3/2003 Shin et al. .................... 285/60
2003/0048241 A1 3/2003 Shin et al. .................... 345/60
2003/0062837 A1 4/2003 Shin et al. .................. 313/585
2003/0070760 A1 4/2003 Kim et al. ............. 156/345.43
2003/0071571 A1 4/2003 Yu et al. ..................... 313/582
2003/0085656 A1 5/2003 Kunhardt et al. ........... 313/619
2003/0127984 A1 7/2003 Kim et al. .................. 313/586
2003/0134506 A1 7/2003 Kim et al. .................. 438/637
2003/0141187 A1 7/2003 Sohn et al. ............ 204/298.07
2004/0022673 A1 2/2004 Protic .......................... 422/28

FOREIGN PATENT DOCUMENTS

EP 1 378 253 A1 1/2004
WO WO-01/44790 A1 6/2001
WO WO-02/49767 A1 6/2002

OTHER PUBLICATIONS

Kunhardt, E.E., "Generation of Large-Volume, Atmosphereic-Pressure, Nonequilibrium Plasmas", *IEEE Transactions on Plasma Science*, vol. 28 No. 1, pp. 189-200, Feb. 2000.

Penetrante et al., "Non-Thermal Plasma Techniques for Abatement of Violatile Organic Compounds and Nitrogen Oxides", *INP Report XIII*, pp. 18-46 (1996).

Chen D.C.C., Lawton, J., and Weinberg, F.K., *Tenth Symposium on Combustion*, pp. 743-754 (1965).

Tarnovsky, V. and Becker, K., *Plasma Sources Science and Technology*, vol. 4, No. 307 (1995).

Knight, Henry de Boyne, the Arc Discharge; its application to power control, *London Chapman & Hall* (1960).

L.A. Rosenthal and D.A. Davis, "Electrical Characterization of a Corona Discharge for Surface Treatment", *IEEE Transaction on Industry Applications*, vol. 1A-11, No. 3, pp. 328-335 (May/Jun. 1975).

S. Han, Y. Lee, H. Kim, J. Lee, J. Yoon, and G. Kim, "Polymer Surface Modification by Plasma Source Ion Implantation", *Surfaces and Coatings Technology*, vol. 93, pp. 261-264 (1997).
Kolman et al., "Genotoxic effects of ethylene oxide, propylene oxide and epichlorohydrin in humans: update review" (1990-2000), Mutation Research 512 (2002) 173-194.
Schoenbach et al., "Special Issue on Nonthermal Medical/Biological Treatments Using Electromagnetic Fields and Ionized Gasses", IEEE Transactions on Plasma Science, vol. 28, No. 1, Feb. 2000.
Jacobs, "STERRAD 100S" Sterilization System; Advanced Sterilization products a Johnson & Johnson Company, 1999 Advanced Sterilization Products.
Sharpless et al. "Interaction of Organophosphonates with $0(^3P)$, $N(^4S)$, $12(a^1\ g)$, and $O_3$", Non-Thermal Plasma Techniques or Pollution control, Nato ASI Series, vol. G 34,Part A, p. 123-137 (1993).
Paur, "Removal of Volatile Hydrocarbons From Industrial Off-Gas", Non-Thermal Plasma Techniques for Pollution Control, Nato ASI Series, vol. G34 Part B, p. 77-89 (1993).
Mizuno et al. "Application of Corona Technology in the Reduction of Greenhouse gases and Other Gaseous Pollutants", Non-Thermal Plasma Techniques for Pollution Control, Nato ASI Series vol. G34 Part B. 165-185 (1993).
Yamamoto et al., "Decomposition of Volatile Organic Compounds By a Packed-Bed Reactor and a Pulsed-Corona Plasma Reactor", Non-Thermal Plasma Techniques for Pollution Control, Nato ASI Series, vol. G34, Part B, p. 223-237 (1993).
Rosocha et al., Treatment of Hazardous Organic Wastes Using Silent Discharge Plasmas, Non-Thermal Plasma Techniques for Pollution Control, Nato ASI Series vol. G34 Part B, p. 281-308 (1993).
Babko-Malyi, Sergei and Nelson, Gordon L., "Experimental Evaluation of Capillary Korona Discharges", American Institute of Aeronautics and Astronautics, 30th Plasmadynamics and Lasers Conference: AIAA-99-3488 (Jun. 28-Jul. 1, 1999), pp. 1-14.
Stark, et al., "Direct Current Glow Discharges in Atmospheric Air", American Institute of Aeronautics and Astronautics, 30th Plasmadynamics and Lasers Conference: AIAA-99-3666 (Jun. 28-Jul. 1, 1999), pp. 1-5.
Babko-Malyi, Sergei, "Ion-drift Reactor Concept", Fuel Processing Technology (1999), pp. 231-246.
Christ, Jr., Buckley, "Leak Testing of Tank Linings by High Voltage Discharge", ElectroTechnic Products, Inc. Guide for Using Company's Probes (1993).
Lawton, James, et al., Electrical Aspects of Combustion, Clarendon Press, Oxford (1969).
Becker, Kurt H., et al., "Collisional and radiative processes in high-pressure discharge plasmas", Physics of Plasmas, vol. 9, No. 5, pp. 2399-2404 (May 2002).
Broer, S., Th. Hammer, Romheld, M., "Treatment of Diesel-Engine Exhaust by Silent Discharge Plasma" INP Report XIII (1996).

* cited by examiner (a)

(b)

USE OF SELF-SUSTAINED ATMOSPHERIC PRESSURE PLASMA FOR THE SCATTERING AND ABSORPTION OF ELECTROMAGNETIC RADIATION

CROSS-REFERENCE TO RELATED APPLICATIONS

This application is a continuation-in-part of U.S. patent application Ser. No. 09/738,923, filed on Dec. 15, 2000, now U.S. Pat. No. 6,818,193 which claims the benefit of U.S. Provisional Application No. 60/171,198, filed Dec. 15, 1999, and U.S. Provisional Application No. 60/171,324, filed Dec. 21, 1999; and this application claims the benefit of U.S. Provisional Application No. 60/316,058, filed on Aug. 29, 2001. All applications are hereby incorporated by reference in their entirety.

BACKGROUND OF THE INVENTION

1. Field of the Invention

The present invention is directed to a self-sustained plasma system and method and, in particular to a non-thermal plasma apparatus using a capillary electrode discharge configuration for the scattering, absorption, and/or reflection of electromagnetic radiation, and a process for using the same.

2. Description of Related Art

Plasma is a term used to denote a region of ionized gas. Plasma can be created through bulk heating of the ambient gas (as in a flame) or by the use of electrical energy to selectively energize electrons (as in electrical discharges). Non-Thermal Plasma (NTP) is ionized gas that is far from local thermodynamic equilibrium (LTE) and characterized by having electron mean energies significantly higher than those of ambient gas molecules. In NTP, it is possible to preferentially direct the electrical energy in order to produce highly energetic electrons with minimal, if any, heating of the ambient gas. Instead, the energy is almost entirely utilized to directly excite, dissociate and ionize the gas via electron impact.

There are many different classifications or types of plasma. The present invention is directed to a particular type of plasma referred to as the cold collisional plasma regime. In this regime the temperature of the free electrons in the plasma is about the same as the temperature of the host, background gas. These free electrons interact with the electromagnetic field of the electromagnetic waves. Energy from the electromagnetic field is absorbed by the free electrons and converted into kinetic energy. When the energetic electron collides with a molecule or atom in the background gas, the energy is transferred as heat. The heat capacity of the background gas is sufficient to absorb this heat without an appreciable rise in temperature.

A cold collisional plasma model is used to describe the interaction between the free electrons and the electromagnetic waves. The dispersion relation governing the propagation of electromagnetic waves through the plasma is represented by equation (1) as $$k = \frac{\omega\sqrt{\varepsilon}}{c} \quad (1)$$

where k is the complex wave number, ω is the angular frequency, c is the speed of light in vacuum, and $\in$ is the complex dielectric constant. The equation that governs the dielectric constant is $$\varepsilon = 1 - \frac{n_c e^2 / m_e \varepsilon_0}{\omega(\omega - i\upsilon)} \quad (2)$$

where $n_e$ is the electron density, e is the electronic charge, $m_e$ is the mass of the electron, v is the collision frequency of the electrons with the host gas, ω is the angular frequency, and $\in_0$ is the complex dielectric constant. Assuming that the electromagnetic field is proportional to exp[−i(ωt−kz)], the plasma will have an absorption constant α of $$\alpha = 2Im(k) \quad (3)$$

where k is the complex wave number and Im(k) is the imaginary component of the wave number.

Thus, the intensity of the electromagnetic waves incident on a plasma decreases by a factor of $$\frac{1}{e}$$

after traveling a distance L through the plasma. Electromagnetic waves traveling through a plasma region over a distance L will be attenuated by the amount given in equation (4) as $$A(L,\alpha) = 4.34\alpha L\ dB \quad (4)$$

When the frequency of the electromagnetic waves lies in the region where $\omega < \upsilon$ and $\omega v < n_e e^2/m_e \epsilon_o$, the absorption coefficient α can be approximated by the equation $$\alpha \approx \frac{n_e e^2}{c v m_e \varepsilon_o} \quad (5)$$

The absorption coefficient α does not depend on the frequency of the electromagnetic waves over the specified range of validity of equation (5). Instead, the absorption coefficient α is broadband and depends on the charge density $n_e$ and the collision frequency v.

If the collision frequency is relatively small and the electron density is not too large then the plasma acts as a mirror and reflects incident electromagnetic waves. More precisely under the conditions where $\omega >> \upsilon$ and $\omega < \sqrt{n_e e^2/m_e \epsilon_o}$ the reflectivity of the plasma region approaches unity. It is under these conditions that the plasma blocks or reflects substantially all incident electromagnetic waves. Under all other conditions the amount or level of reflection is less than 100% so some or all incident electromagnetic waves are absorbed.

Other work in this area includes U.S. Pat. No. 5,594,446 to Vidmar, et al., entitled, "Broadband Electromagnetic Absorption via a Collisional Helium Plasma," which discloses a sealed container filled with Helium in which a non-self-sustained plasma is generated using a plurality of ionization sources, for example, electron-beam guns, as an electromagnetic anechoic chamber. This apparatus is limited in that it requires the use of a sealed container and is limited to use with Helium.

It is therefore desirable to develop a system and method for absorbing or scattering of electromagnetic waves that solves the shortcomings of conventional prior art systems and methods, such as being self-sustaining, that is, not requiring an external means of generating electrons lost through recombination processes, negative ion formation, etc., other than the electric field applied to maintain its equilibrium state. Such external means may include but are not limited to an electron gun, a photo-ionizing source, etc. Furthermore, it is also desirable for the improved system to be more energy efficient, operable under ambient pressure and temperature, and operable with a variety of gasses without requiring a sealed vacuum environment.

SUMMARY OF THE INVENTION

The present invention seeks to provide a means of absorbing or scattering electromagnetic waves that is adaptable to a wide variety of practical arrangements. This is achieved by constructing a plasma panel that utilizes self-stabilizing discharge electrodes to produce a self-sustained plasma of sufficient electron density to change the dielectric constant of the panel. Self-stabilizing refers to the active current limiting property of the electrode which results in the suppression of the glow to arc transition (e.g., as disclosed in U.S. Pat. No. 6,005,349), whereas the term self-sustaining refers to a property of the plasma where the maintenance of its equilibrium state does not require an external ionizing source. The following advantages are associated with the present inventive system that employs a capillary discharge electrode plasma panel configuration for absorbing or scattering electromagnetic waves:

a) increased energy efficiency utilization per unit volume of plasma;

b) simplified engineering, easily scaleable reactors operating under ambient pressure and temperature;

c) operates with a variety of gasses, including air, eliminating the need for vacuum systems and freeing the user from the constraints of operating in a sealed environment;

d) modular panel design provides layout flexibility to accommodate the user's specific needs;

e) modular panel design provides the possibility of use as an appliqué to the exterior of a surface to modify the level of electromagnetic exposure of the surface; and f) substantially reduced power to plasma volume ratio leading to a relatively small system footprint.

One embodiment of the present invention is directed to a self-sustained atmospheric pressure system for absorbing or scattering electromagnetic waves. The system includes an electromagnetic source for producing electromagnetic waves, a plasma panel disposed to receive incident thereon electromagnetic waves produced by the electromagnetic source, a power supply electrically connected to the plasma panel, and a detector for receiving scattered electromagnetic waves reflected off of the plasma panel. The power supply is turnable on/off so as to generate/cease producing a non-thermal plasma between the first dielectric and second dielectric, respectively. The plasma panel comprises: (i) a first dielectric having at least one capillary defined therethrough, (ii) a segmented electrode disposed proximate and in fluid communication with the at least one capillary, and (iii) a second electrode having a first surface disposed closest towards the first dielectric and an opposite second surface. The second electrode is separated a predetermined distance from the first dielectric. A second dielectric layer is coated on the first surface of the second electrode. The assembled second electrode and second dielectric layer have at least one opening defined therethrough.

The present invention is also directed to a method for controlling exposure of an object disposed behind a plasma panel to electromagnetic waves using the system described above. Initially, the object is illuminated with electromagnetic waves radiated from the electromagnetic source and the generation of plasma is controlled by varying the supply of power to the plasma panel. Thus, controlling the generation of plasma is used to vary level and/or duration of exposure of the object to electromagnetic radiation. If the plasma generated is substantially uniform then substantially all of the incident electromagnetic waves will be absorbed when the plasma panel is turned on thereby substantially prohibiting exposure of the object (disposed downstream of the plasma panel) to the electromagnetic waves. On the other hand, when the plasma panel is turned off and the plasma ceases from being produced, thereby allowing the electromagnetic waves to reach the object. The power supply to the plasma panel may be pulsed, periodically or non-periodically, and the exposure of the object to electromagnetic waves detected.

Alternatively, the plasma being generated may be non-uniform so that the plasma panel reflects at least some of the electromagnetic waves incident on its surface. If the electromagnetic source emits multiple wavelength electromagnetic waves, the plasma panel will scatters waves reflected from its surface in different directions according to their respective individual wavelengths. The degree of separation between the various wavelength components depends on arrangement of and spacing between the capillaries. Thus, the system may be used as a diffraction grating for separating multiple wavelength electromagnetic waves into its respective wavelength components.

BRIEF DESCRIPTION OF THE DRAWINGS

The foregoing and other features of the present invention will be more readily apparent form the following detailed description and drawing of illustrative embodiments of the invention wherein like reference numbers refer to similar elements throughout the several views and in which:

FIG. 1(*b*) is cross-sectional view of the plasma panel of FIG. 1(*a*) along line 1—1;

DETAILED DESCRIPTION OF THE INVENTION

The present invention provides an apparatus for the absorption or scattering of electromagnetic waves and a method for using the same. Absorption is achieved through the introduction of substantially uniform, collisional plasma in the path of propagation of electromagnetic waves. On the other hand, scattering (or diffraction) is achieved through the generation of localized plasma regions, which serve as an array of discrete scattering centers, along the path of propagation of electromagnetic waves.

Figure 1:
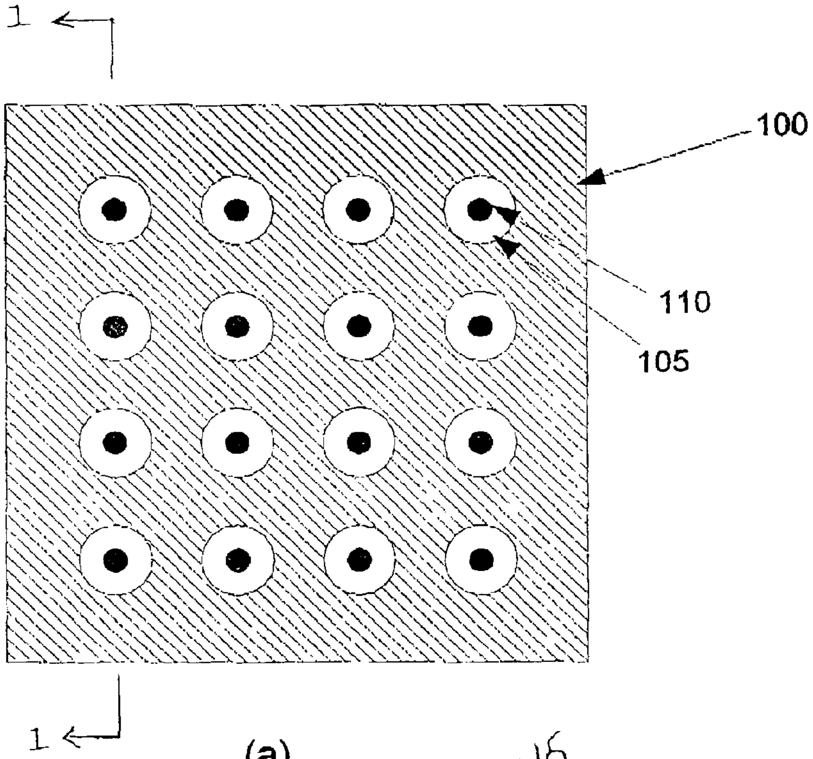
FIG. 1(*a*) is a top view of an exemplary capillary electrode discharge plasma panel configuration in accordance with the present invention.
Figure 1:
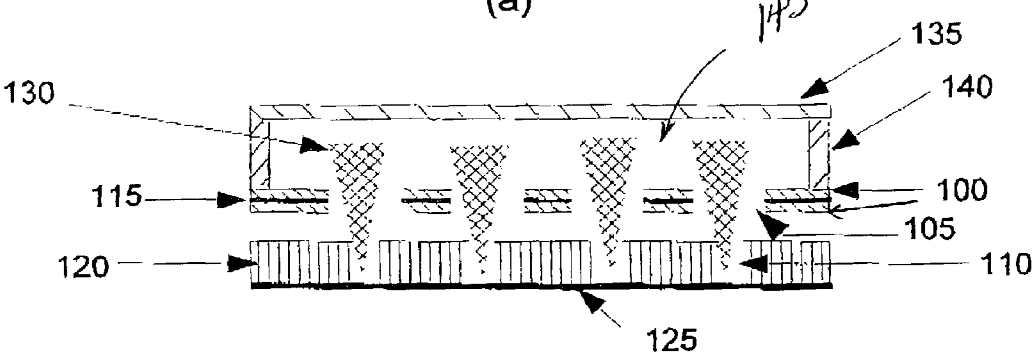

FIGS. 1(*a*) and (*b*) show an exemplary capillary plasma panel configuration in accordance with the present invention, as described in U.S. patent application Ser. No. 09/738,923, filed on Dec. 15, 2000, which is herein incorporated by reference in its entirety. In particular, FIG. 1(*b*) is a cross-sectional view of the capillary plasma panel of FIG. 1(*a*) along line 1—1. The panel comprises a first dielectric 120 having one or more capillaries 110 defined therethrough and a segmented electrode 125 disposed proximate to and in fluid communication with an associated capillary 110. The segmented electrode 125 may, but need not necessarily, protrude partially into the capillary 110. A second electrode 115 is disposed beneath the first dielectric 120. In the arrangement shown in FIG. 1(*b*) the second electrode 115 is insulated between two dielectric layers 100. Alternatively, the second electrode 115 may have a single insulating layer disposed on its surface proximate the segmented electrode 125. One or more apertures 105 are defined through the assembled second electrode 115 and dielectric layers 100. The apertures 105 and capillaries 110 are preferably arranged substantially concentric with one another (see FIG. 1(*a*)) to allow the plasma 130, which emanates from the capillaries 110 to extend beyond and effectively shroud the assembled second dielectric layers 100 and second electrode 115 with plasma. In an alternative configuration, the apertures 105 may be offset relative to the capillaries 110. The number, size and shape of the apertures 105 and capillaries 110 need not necessarily be the same and may be varied, as desired. In the embodiment shown in FIG. 1(*b*) each aperture 105 has a larger diameter than its associated capillary 110. This relationship is advantageous in that the plasma generated upon the application of a voltage differential between the two electrodes 115, 125 diffuses when it passes through the apertures 105 to cover a larger surface area. This relationship between diameters of aperture 105 and capillary 110 is not critical to the scope of the present invention and thus may be modified.

A cover plate 135, preferably one selected so as to prohibit the passage of the electromagnetic waves of interest, may be placed proximate the surface of the second electrode 115 farthest away from the first dielectric 120 to collect the plasma in a space 145 defined therebetween by a spacer 140. The spacer 140 may also serve to hermetically seal the space 145. The thickness of the plasma 130, the electron collision rate, and the density of the electrons produced by the plasma will determine the levels of absorption and reflection of the capillary plasma panel. If the spacing of the capillaries 110 is comparable to the wavelength of the incident electromagnetic waves and the arrangement of the capillaries 110 is sufficient to create a substantially uniform plasma layer in the region between the first dielectric 120 and the assembled second electrode 115 and dielectric layers 100 then the plasma will absorb the incident electromagnetic waves. Otherwise, the capillaries 110 will act as discrete scattering centers and diffraction effects will occur similar to Bragg scattering observed by X-rays incident on crystalline structures.

Figure 2:
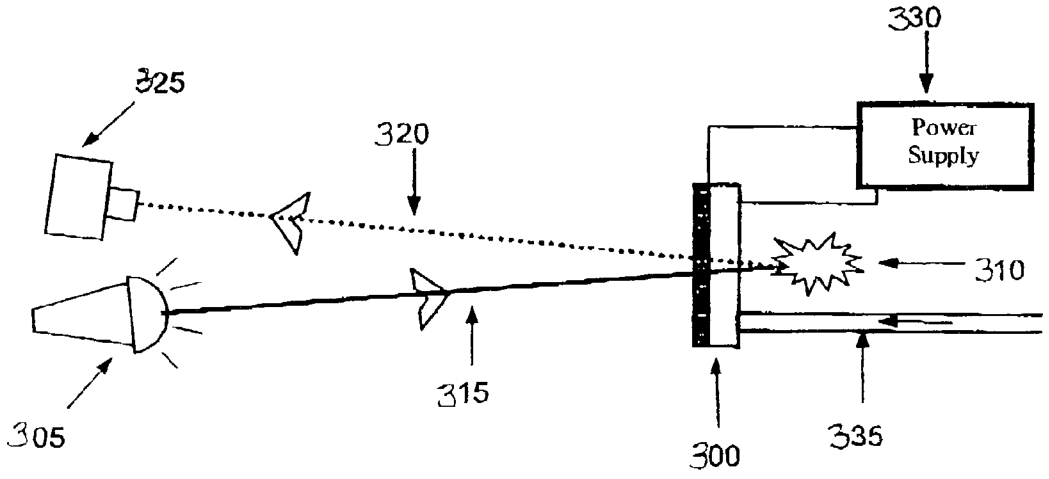
FIG. 2 is a schematic drawing of an exemplary application of the plasma panel in accordance with the present invention for controlling the level and/or duration of exposure of an object to electromagnetic radiation.

FIG. 2 demonstrates an application of a capillary plasma panel 300 for controlling the level and/or duration of exposure of an object to electromagnetic radiation. An electromagnetic source 305 is used to illuminate an object 310, which is located behind the plasma panel 300 having the capillaries arranged so as to generate a substantially uniform plasma. The incident electromagnetic waves 315 pass through the plasma panel 300 when the plasma is off and are absorbed when it is on. This affects the amount of scattered electromagnetic waves 320 arriving at the detector 325. The generation of plasma is controlled by a power supply 330 connected to the plasma panel 300 and if a carrier gas other than air is desired this can be fed in through an external gas line 335. The electromagnetic source 305 may be continuous or modulated. If the source 305 is modulated the detector 325 and/or the supply of power from the power supply 330 to the plasma panel 300 can be readily synchronized with it. This setup provides great latitude to a user wishing to study the interaction of the object 310 with electromagnetic waves. For example, if the electromagnetic source 305 is operated continuously the supply of power to the plasma panel 300 can be used to vary the intensity of the incident electromagnetic waves 315 reaching the object 310 or block them out completely. If the temporal evolution of the object 310 is to be studied the power supply 330 may be pulsed (periodically or non-periodically) to turn the plasma panel 300 on/off thereby alternately blocking/absorbing electromagnet waves directed towards the object 310 thereby allowing the detector 325 to receive "snapshots" of the object 310 over time.

Figure 3:
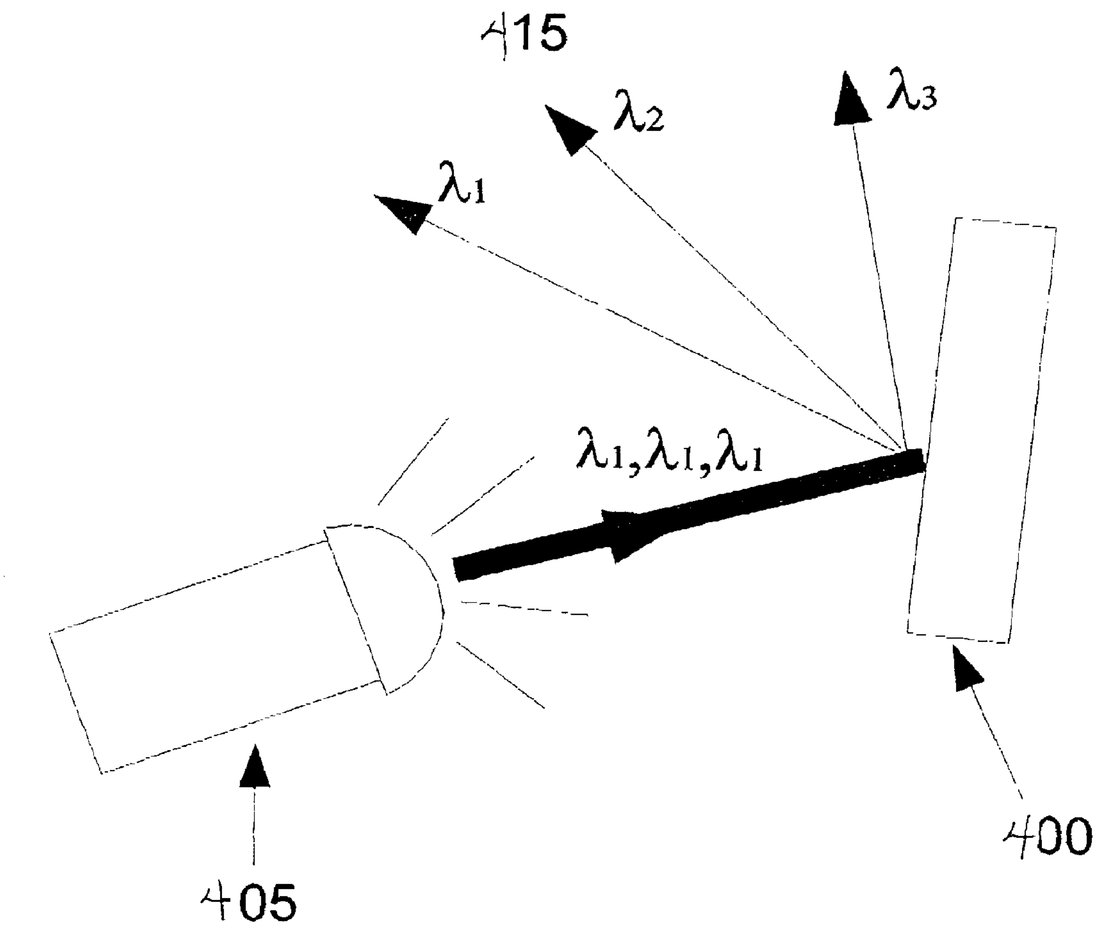
FIG. 3 is a schematic drawing of another exemplary application of the plasma panel in accordance with the present invention as a diffraction grating to resolve the various components of a multiple wavelength electromagnetic source.

FIG. 3 demonstrates a capillary discharge electrode plasma panel 400 with a predetermined arrangement of capillaries being used as a diffraction grating. In this situation the plasma is non-uniform with the plasma being largely confined to an area in the immediate vicinity of the capillaries. An electromagnetic source 405 emits multiple wavelength electromagnetic waves $\lambda_1\ \lambda_2\ \lambda_3 \ldots \lambda_n$ the slot plasma panel 400 scatters waves reflected from its surface in different directions according to their respective individual wavelengths 415. It is then a trivial matter to redirect a particular wavelength component to an appropriate object, for example, using mirrors. The degree of separation between the various wavelength components will depend upon the spacing and arrangement of the capillaries.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

All patents, publications, and applications mentioned above are hereby incorporated by reference.

What is claimed is:

1. A self-sustained atmospheric pressure system for absorbing or scattering electromagnetic waves, comprising:

an electromagnetic source for producing electromagnetic waves;

a plasma panel disposed to receive incident thereon electromagnetic waves produced by the electromagnetic source, the plasma panel comprising:

a first dielectric having at least one capillary defined therethrough;

a segmented electrode disposed proximate and in fluid communication with the at least one capillary;

a second electrode having a first surface disposed closest towards the first dielectric and an opposite second surface, the second electrode being separated a predetermined distance from the first dielectric, the first surface of the second electrode being coated with a second dielectric layer, the assembled second electrode and second dielectric layer having at least one opening defined therethrough;

a power supply electrically connected to the plasma panel, the power supply being turnable on and off, a non-thermal plasma being generated between the first dielectric and second dielectric only while the power supply is on; and a detector for receiving scattered electromagnetic waves reflected off of the plasma panel.

2. The system in accordance with claim 1, wherein the plasma is substantially uniform and the plasma panel absorbs substantially all incident electromagnetic waves.

3. The system in accordance with claim 1, wherein the plasma is non-uniform and the plasma panel reflects at least some of the incident electromagnetic waves.

4. The system in accordance with claim 3, wherein the electromagnetic source emits multiple wavelength electromagnetic waves, and the plasma panel scatters waves reflected from its surface in different directions according to their respective individual wavelengths.

5. The system in accordance with claim 4, wherein the degree of separation between the various wavelength components depends on arrangement of and spacing between the capillaries.

6. The system in accordance with claim 1, wherein the opening and capillaries are arranged substantially concentric with one another.

7. The system in accordance with claim 1, wherein the diameter of the capillary is greater than the diameter of its associated opening.

8. The system in accordance with claim 1, wherein the opening and capillary have a circular cross-sectional shape.

9. The system in accordance with claim 1, wherein the plasma panel further comprises a cover separated a predetermined distance from the second surface of the second electrode by a spacer, the cover substantially prohibiting passage of electromagnetic waves therethrough.

10. The system in accordance with claim 1, wherein the second surface of the second electrode is coated with the second dielectric.

11. A method for controlling exposure of an object disposed behind a plasma panel to electromagnetic waves using a system including an electromagnetic source for directing incident electromagnetic waves to a plasma panel electrically connected to a power supply to produce plasma, the method comprising the steps of:

illuminating the object with electromagnetic waves generated by the electromagnetic source; and controlling the generation of plasma by varying the supply of power to the plasma panel, the plasma panel comprising:

a first dielectric having at least one capillary defined therethrough;

a segmented electrode disposed proximate and in fluid communication with the at least one capillary;

a second electrode having a first surface disposed closest towards the first dielectric and an opposite second surface, the second electrode being separated a predetermined distance from the first dielectric, the first surface of the second electrode being coated with a second dielectric layer, the assembled second electrode and second dielectric layer having at least one opening defined therethrough.

12. The method in accordance with claim 11, wherein said controlling step comprises varying at least one of level and duration of exposure of the object to electromagnetic radiation.

13. The method in accordance with claim 11, wherein the plasma is substantially uniform.

14. The method in accordance with claim 13, wherein the controlling step comprises blocking substantially all of the electromagnetic rays from reaching the object by turning on the power supply to generate the plasma and allowing substantially all of the electromagnetic waves to reach the object by turning off the power supply to cease generating the plasma.

15. The method in accordance with claim 11, wherein the controlling step comprises pulsing on and off the power supply.

16. The method in accordance with claim 15, wherein the pulses are periodic or non-periodic.

17. The method in accordance with claim 11, wherein the electromagnetic source is continuous.

18. The method in accordance with claim 11, wherein the electromagnetic source is modulated.

19. The method in accordance with claim 18, further comprising the step of synchronizing the electromagnetic source and the power source.

20. The method in accordance with claim 11, wherein the plasma is non-uniform and the controlling step comprises reflecting at least some of the electromagnetic waves incident on the plasma panel.

21. The method in accordance with claim 20, wherein the electromagnetic source emits multiple wavelength electromagnetic waves, and the plasma panel scatters waves reflected from its surface in different directions according to their respective individual wavelengths.

22. The method in accordance with claim 21, wherein the degree of separation between the various wavelength components depends on arrangement of and spacing between the capillaries.

23. The method in accordance with claim 11, wherein the opening and capillaries are arranged substantially concentric with one another.

24. The method in accordance with claim 11, wherein the diameter of the capillary is greater than the diameter of its associated opening.

25. The method in accordance with claim 11, wherein the openings and capillaries have a circular cross-sectional shape.

26. The method in accordance with claim 11, wherein the plasma panel further comprises a cover separated a predetermined distance from the second surface of the second electrode by a spacer, the cover substantially prohibiting the passage of electromagnetic waves therethrough.

27. The method in accordance with claim 11, wherein the second surface of the second electrode is coated with the second dielectric.

* * * * *

UNITED STATES PATENT AND TRADEMARK OFFICE

CERTIFICATE OF CORRECTION

PATENT NO. : 7,094,322 B1
APPLICATION NO. : 10/233176
DATED : August 22, 2006
INVENTOR(S) : George Korfiatis et al.

It is certified that error appears in the above-identified patent and that said Letters Patent is hereby corrected as shown below:

In the Assignee Title Page (73):

Please delete “Plasmasol Corporation Wall Township, NJ (US)” and substitute

-- Plasmasol Corporation, Wall Township, NJ (US) --.

Signed and Sealed this

Twenty-eighth Day of November, 2006

JON W. DUDAS
*Director of the United States Patent and Trademark Office*